Jan. 8, 1963  R. M. SAXBY  3,072,258
FUEL FILTER
Filed May 31, 1960
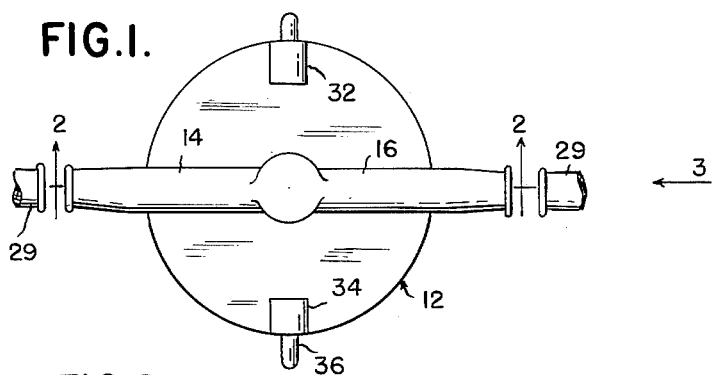
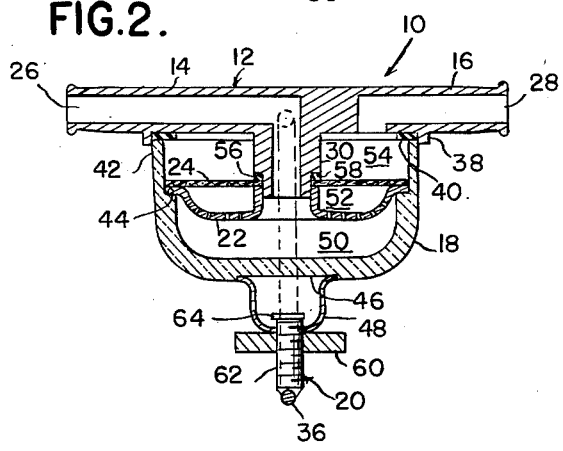
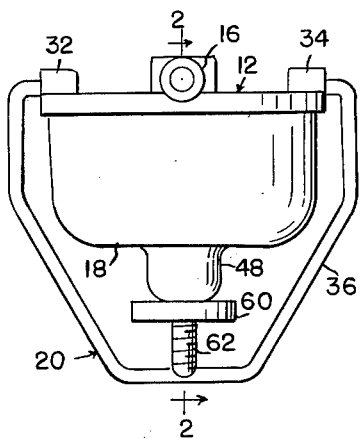
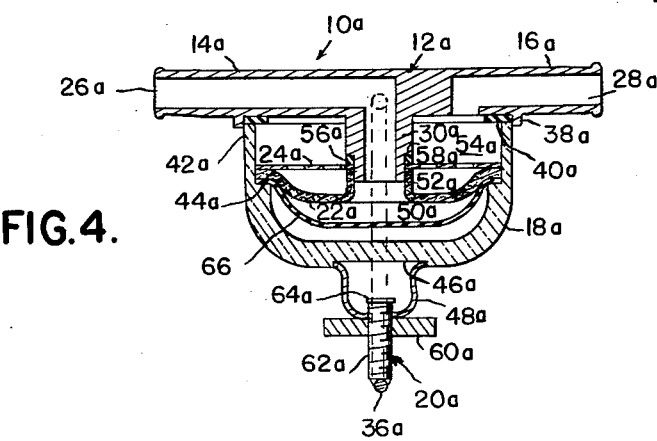
*INVENTOR.*
RICHARD M. SAXBY
BY Whittemore
Hulbert & Belknap
ATTORNEYS

United States Patent Office 3,072,258
Patented Jan. 8, 1963

3,072,258
FUEL FILTER
Richard M. Saxby, Detroit, Mich., assignor to Holley Carburetor Company, Van Dyke, Mich., a corporation of Michigan
Filed May 31, 1960, Ser. No. 32,818
3 Claims. (Cl. 210—94)

The present invention relates generally to fuel filters and refers more particularly to an improved two-stage fuel filter structure.

In the past placing of filters in fuel lines either before or after the fuel passes through a fuel pump which filters operate to filter foreign material from the fuel have been known. Usually such filters have been of single stage construction, that is to say contain a single filter element. Where filters having more than one filter element have been used in the past the filter elements have either not been spaced from each other or have otherwise been located so as not to form separate chambers through which the fuel was positively required to pass. Thus in the past the filtering capabilities of multiple filters have not been made maximum use of.

Further the filter elements of the multiple element filters of the past have usually been difficult to service due to their positioning in a fuel line. Also many of the multiple element filters of the past have provided no way by which the individual filter elements could be inspected to indicate whether the elements need servicing without removing the filter elements.

It is therefore one of the objects of the present invention to provide improved two element two-stage fuel filter structure.

Another object is to provide a two element fuel filter including means for observing the installed filter elements so that it may be easily determined when the elements need service.

Another object is to provide a fuel filter constructed to permit easy removal of the filter element for servicing.

More specifically it is a purpose to provide a fuel filter comprising a chamber divided into three parts by a pair of filter elements, an inlet conduit discharging into a first part of said chamber, and a discharge conduit leading from the last of the parts of the chamber whereby fuel introduced into the first part of the chamber through the inlet conduit is caused to pass successively through the pair of filters and to be discharged from the last part of said chamber through the outlet conduit.

Still more specifically it is a purpose of the present invention to provide a two-stage fuel filter comprising a filter cap having an inlet conduit and an outlet conduit integral therewith adapted to be connected into a fuel line, a filter bowl divided vertically into three separate chambers by means of a pair of filter elements, said filter bowl being adapted to be removably secured to the filter cover, the inlet conduit being adapted to discharge fuel into the lower chamber whereby the fuel is caused to filter upward through the intermediate and upper chambers and is discharged from the filter through the outlet conduit.

Structure as set forth above wherein the filter bowl is secured to the cover by means of a bail seat positioned centrally of the filter bowl, a bail pivotally mounted on the cover and a bail screw and nut operable between the bail and bail seat.

Another purpose is to provide structure as set forth above wherein a flexible diaphragm is provided between the inlet conduit and the bottom of the filter bowl which is operable to smooth out the pulsations of fuel entering the bottom chamber of the filter bowl to provide a more uniform flow of fuel from the fuel filter.

Another object is to provide a two-stage fuel filter which is simple in structure, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a plan view of a two-stage fuel filter according to the invention.

FIGURE 2 is a cross-sectional view of the fuel filter shown in FIGURE 1 taken on the line 2—2 in FIGURE 1.

FIGURE 3 is an elevational view of the fuel filter shown in FIGURE 1 taken in the direction of arrow 3 in FIGURE 1.

FIGURE 4 is a sectional view similar to FIGURE 2 of a modification of the two-stage fuel filter illustrated in FIGURES 1–3.

With particular reference to the figures a specific embodiment of the two-stage fuel filter of the invention will now be disclosed.

The fuel filter generally indicated 10 illustrated in FIGURES 1–3 comprises a cover 12 having inlet conduit 14 and outlet conduit 16 integral therewith, and filter bowl 18 secured to the cover 12 by bail means generally indicated 20. Filters 22 and 24 are provided in filter bowl 18 as shown.

In operation fuel is introduced into the bottom of bowl 18 through inlet conduit 14 and passes upward through filters 22 and 24 and out of the outlet conduit 16. It will be readily understood that bowl 18 may be easily removed from cover 12 on loosening bail means 20 when necessary whereby servicing of the filters may be easily accomplished. Further with bowl 18 made of clear material the filters may be readily inspected to determine the need for servicing thereof.

More specifically the cover 12 as shown is generally circular in plan and has inlet conduit 14 and outlet conduit 16 constructed integrally therewith. The conduits 14 and 16 are adapted at the ends 26 and 28 thereof to be connected in a fuel line 29 as will be readily understood by those in the art. The end 30 of inlet conduit 14 extends downwardly as shown in FIGURE 2 whereby fuel from conduit 14 is introduced into filter bowl 18 at the bottom thereof.

Bosses 32 and 34 on cover 12 serve to pivotally mount the bail 36 of bail means 20 as shown. Downwardly extending annular flange 38 is also provided on cover 12 as shown to receive seal 40 and the edge portion 42 of filter bowl 18.

Filter bowl 18 is shaped as shown best in FIGURE 2. The bowl 18 includes an annular offset 44 on the inner surface thereof as shown adapted to receive the radially outer edge of the filters 22 and 24. Bowl 18 further includes a shallow recess 46 in the outer surface in the center of the bottom thereof to position the seat 48 of the bail means 20. As shown the filter bowl 18 is adapted to fit within the annular flange 38 of cover 12 with the edge portion 42 held securely against the seal 40 by bail means 20.

Filters 22 and 24 shaped as shown are provided in bowl 18 and are so positioned as to divide the bowl 18 into a lower chamber 50, an intermediate chamber 52 and an upper chamber 54. The filters are held in position by the annular abutment 56 provided on the downwardly extending portion 30 of inlet conduit 14 and the annular abutment 44 on the interior surface of the bowl 18 as illustrated. Seal 58 is provided adjacent abutment 56 to prevent leakage of fuel from chamber 50 to chamber 54 as will be understood.

The filter 24 may be of suitable ceramic, porous bronze or other filtering material. The main criterion for filter material 22 is that it be sufficiently porous to pass the fuel being filtered and not sufficiently porous to pass foreign material of predetermined size which it is to filter from the fuel.

Filter 22 may be a perforated metallic member which is permanently magnetized. The purpose of filter 22 is to attract and hold any minute metallic particles such as magnetic oxides which may be suspended in the fuel before it passes through filter 22. The magnetic filter element is preferably positioned before the filter element 24 with respect to fuel flow through the two-stage filter so as to prevent filter 24 from being loaded with filterable material which could be removed by the magnetic stage.

While specific filter materials have been indicated for filters 22 and 24 it will be obvious that the choice of the filter materials will depend on the particular fuel and elements it is desired to filter therefrom and thus the filter material may be chosen according to particular requirements of the fuel being filtered.

As indicated previously the filter bowl 18 is held in position against seal 40 within annular flange 38 by bail means 20. Bail means 20 comprises bail 36, bail seat 48, bail nut 60 and bail screw 62. As shown bail 36 is pivotally mounted in bosses 32 and 34 in cover 12. The bail screw 62 is fixedly attached to the bail 36 and has mounted on the end thereof by means of flange 64 the bail seat 48.

In operation of the bail means 20 when it is desired to remove filter bowl 18 the bail nut 60 is moved on bail screw 62 away from bail cap 48 allowing the bail cap 48 to be removed from recess 46 whereby the bail 36 may be pivoted to permit downward removal of the bowl 18 as shown in FIGURE 2.

The bowl may be replaced in exactly the reverse manner by first placing the bowl in the position shown in FIGURE 2, pivoting the bail 36 so that the bail seat 48 is in position over recess 46 and moving the nut 60 along screw 62 to firmly seat the bail seat in recess 46.

In over-all operation of the two-stage fuel filter of the invention fuel from a fuel line is either pumped or drawn through the filter 10 by means of a fuel pump (not shown). The fuel enters chamber 50 of the fuel bowl 18 from inlet conduit 14 and due to the force of the pump is passed through filter 22 which being permanently magnetized removes any small metal particles from the fuel as it passes into chamber 52. The fuel then passes through filter 24 where foreign matter above a specific size determined by the porosity of the filter is removed from the fuel as it passes into chamber 54. The fuel in chamber 54 then passes through conduit 16 to continue through the fuel line.

Thus it can be seen that this invention has provided a two-stage fuel filter structure which is simple, economical and efficient. Further it will be noted that with applicant's structure the filter bowl 18 is readily removable due to the bail means 20 so that the filters 22 and 24 may be serviced. In addition it will be understood that the bowl 18 may be transparent whereby the fuel entering the filter, the filters and the filtered fuel may be readily inspected to determine the need for servicing of the filters without disturbing the filter 10.

A modified two-stage fuel filter 10a is illustrated in FIGURE 4. The fuel filter 10a includes the structure of the fuel filter 10 with the filters 22a and 24a being of interchanged material. In addition the fuel filter 10a includes a flexible elastic diaphragm 66 located between the filter 22a and filter bowl 18a as shown. The diaphragm 66 expands on a surge of fuel being fed into chamber 50a and contracts when the pressure on the fuel in inlet conduit 14a is reduced. Thus diaphragm 66 serves to dampen surges of fuel through the fuel filter 10a.

The drawings and the foregoing specification constitute a description of the improved two-stage fuel filter structure in such full, clear, concise and exact terms as to enable any person skilled in the art to practice the invention, the scope of which is indicated by the appended claims.

What I claim as my invention is:

1. A fuel filter comprising a transparent cylindrical filter chamber closed at one end and open at the other end including an annular interior abutment substantially midway thereof, a rigid annular first filter positioned within the cylindrical filter chamber the radially outer periphery of which is supported in the filter chamber on the annular interior abutment, a rigid annular second filter positioned within said filter chamber with the radially outer periphery thereof in engagement with the radially outer periphery of the first filter and with the radially inner periphery thereof in engagement with the radially inner periphery of the first filter, said first and second filters having portions in spaced relation between the radially inner and outer peripheries thereof, a cap member for closing said other end of said cylindrical filter chamber including a circular flange depending therefrom adapted to completely surround said other end of said cylindrical filter chamber, said cap including fuel inlet and outlet passages therein and a tubular extension of one of said passages extending substantially axially of the cylindrical filter chamber which tubular extension has an annular exterior abutment thereon engageable with the inner periphery of the second filter whereby fuel from said one passage is directed into a first chamber formed between the cylindrical filter chamber and first filter, the other passage terminating within a second chamber formed between the cap member, filter chamber and second filter member, and means for securing the cap member, cylindrical filter chamber and filters in rigid assembly.

2. Structure as claimed in claim 1 wherein said first filter is a porous permanent magnet operable to remove small metal particles from fuel being filtered and the second filter is of porous material operable to prevent passage therethrough of material larger than a predetermined maximum size.

3. Structure as claimed in claim 1 and further including a flexible elastic diaphragm disc located in said first chamber the outer periphery of which is positioned between the outer periphery of said first filter and the interior annular abutment in said cylindrical filter chamber and which is operable to dampen surges of fuel through said filter chamber.

References Cited in the file of this patent

UNITED STATES PATENTS

| | | |
|---|---|---|
| 1,146,748 | Bennett | July 13, 1915 |
| 1,639,170 | Fell | Aug. 16, 1927 |
| 2,151,538 | Swanson | Mar. 21, 1939 |
| 2,544,289 | Andrews | Mar. 6, 1951 |
| 2,893,561 | Duzich | July 7, 1959 |
| 2,943,739 | Maynard | July 5, 1960 |
| 2,976,999 | Paton | Mar. 28, 1961 |

FOREIGN PATENTS

| | | |
|---|---|---|
| 201,616 | Austria | Jan. 10, 1959 |
| 1,213,694 | France | Nov. 2, 1959 |